(12) United States Patent
Kim

(10) Patent No.: US 9,005,092 B2
(45) Date of Patent: Apr. 14, 2015

(54) TOOL GRIPPER CHAIN BENDABLE IN TWO DIRECTIONS

(75) Inventor: Soo-Heon Kim, Gyeongsangnam-Do (KR)

(73) Assignee: Doosan Infracore Co., Ltd., Incheon (KR)

( * ) Notice: Subject to any disclaimer, the term of this patent is extended or adjusted under 35 U.S.C. 154(b) by 881 days.

(21) Appl. No.: 13/129,233

(22) PCT Filed: Nov. 2, 2009

(86) PCT No.: PCT/KR2009/006371
§ 371 (c)(1),
(2), (4) Date: May 13, 2011

(87) PCT Pub. No.: WO2010/056005
PCT Pub. Date: May 20, 2010

(65) Prior Publication Data
US 2011/0218087 A1  Sep. 8, 2011

(30) Foreign Application Priority Data

Nov. 14, 2008  (KR) .................. 10-2008-0113244

(51) Int. Cl.
*B23Q 3/157* (2006.01)
*B23Q 3/155* (2006.01)

(52) U.S. Cl.
CPC .......... *B23Q 3/15526* (2013.01); *B23Q 3/1572* (2013.01); *B23Q 3/15553* (2013.01); *B23Q 3/15746* (2013.01)

(58) Field of Classification Search
CPC .......... B65G 1/12; B65G 1/127; B65G 1/133; B23Q 3/1572; B23Q 3/15726; B23Q 3/15733; B23Q 3/15746; B23Q 3/15766; B23Q 3/15774; B23Q 3/15776; B23Q 3/1574

USPC .................. 483/59, 66, 68; 211/1.56, 70.6
See application file for complete search history.

(56) References Cited

U.S. PATENT DOCUMENTS 3,817,391 A * 6/1974 Lohneis et al. .............. 211/1.56
4,699,276 A * 10/1987 Kis .............................. 211/1.56
(Continued)

FOREIGN PATENT DOCUMENTS

DE           3431091 A1   3/1986
DE      102005052353 A1   5/2007
(Continued)

OTHER PUBLICATIONS

Extended European Search Report dated Mar. 22, 2013 for European Patent Application No. 09826237.1, 6 pages.
(Continued)

*Primary Examiner* — Erica E Cadugan
*Assistant Examiner* — Michael Vitale
(74) *Attorney, Agent, or Firm* — John D. Veldhuis-Kroeze; Westman, Champlin & Koehler, P.A.

(57) ABSTRACT

The present disclosure relates to a tool gripper chain bendable in two directions that has a chain assembly that includes: gripper blocks that each have a first tooth at the center of a curved groove; first and second gripper assemblies that have first and second gripper members rotatably mounted on the rear of gripper blocks and grip a tool; first and second outer links that are formed in an arc shape; first and second inner links that are formed in an arc shape and disposed zigzag with respect to first and second outer links between first outer link and second outer link; and first and second collars that are disposed between first inner link and second inner link, in which first gripper assembly is disposed in front of second outer link, second gripper assembly is disposed ahead of second inner ink, and a first shaft hole of first gripper assembly and second shaft hole of second gripper assembly are coaxially arranged, such that first and second gripper assemblies are coupled by a first shaft or a second shaft.

4 Claims, 8 Drawing Sheets

(56) References Cited

U.S. PATENT DOCUMENTS

| | | | |
|---|---|---|---|
| 6,428,454 B1 * | 8/2002 | Yokota et al. | 483/68 |
| 2002/0137612 A1 | 9/2002 | Oitaka et al. | |

FOREIGN PATENT DOCUMENTS

| | | |
|---|---|---|
| JP | 2001038559 A | 2/2001 |
| JP | 2001062661 A | 3/2001 |
| JP | 2002337035 A | 11/2002 |
| JP | 2003275934 A | 9/2003 |

OTHER PUBLICATIONS

Search Report dated Apr. 30, 2010 for International Application No. PCT/KR2009/006371, filed Nov. 2, 2009.

Korean Office Action dated Jan. 7, 2015 for corresponding Korean Application No. 10-2008-0113244, 4 pages.

* cited by examiner

TOOL GRIPPER CHAIN BENDABLE IN TWO DIRECTIONS

CROSS-REFERENCE TO RELATED APPLICATIONS

This Application is a Section 371 National Stage Application of International Application No. PCT/KR2009/006371, filed Nov. 2, 2009 and published, not in English, as WO2010/056005 on May 20, 2010.

FIELD OF THE DISCLOSURE

The present disclosure relates to a tool gripper, and more particularly, to a tool gripper chain that is installed at a tool magazine of a machine tool and can be moved by operation of a driving unit to a position where a specific tool among a plurality of tools mounted and held on a gripper is removed.

BACKGROUND OF THE DISCLOSURE

In general machine tools, a plurality of tools is held in a tool magazine and a specific tool is removed or mounted back by a command from a controller.

Further, in the tool magazine, a gripper is disposed at one side of a chain, the chain is engaged with a plurality of chain sprockets, such that as the sprockets rotate, the chain moves to an automatic tool changer (ATC) where a tool at a specific position is removed, or mounts a tool sent from the ATC to the gripper of the chain.

However, each link constituting the chain is equipped with a gripper in the chain of the related art, but the chain bends outward only, not inward, when bending.

Since the chain cannot bend inward, any one gripper may interfere with an adjacent gripper or the chain cannot smoothly come in contact to the chain sprocket when bending backward.

Further, it is required to install more kinds of tools in order to machine workpieces having various shapes, but since the chain of the related art bends only outward in a convex shape, it is necessary to design and manufacture the tool magazine in a large size in order to increase the number of tools.

In particular, considering the size of the tool magazine and the number of tools, the occupied space inefficiently increases, such that a relatively small number of tools are necessarily disposed in a unit area.

The discussion above is merely provided for general background information and is not intended to be used as an aid in determining the scope of the claimed subject matter.

SUMMARY

The disclosed embodiments have been made in an effort to provide a tool gripper chain bendable in two directions that makes it possible to dispose a larger number of tools in a unit area than a chain of the related art.

The technical problems are not limited to the foregoing technical problems. Other technical problems, which are not described, can clearly be understood by those skilled in the art from the following description.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An exemplary embodiment of the present disclosure provides a tool gripper chain bendable in two directions having a chain assembly that includes: gripper blocks that each have a first tooth at the center of a curved groove; first and second gripper assemblies that have first and second gripper members rotatably mounted on the rear of the gripper blocks and grip a tool;

first and second outer links that are formed in an arc shape; first and second inner links that are formed in an arc shape and disposed offset with contact surfaces with respect to the first and second outer links between the first outer link and the second outer link; and first and second collars that are disposed between the first inner link and the second inner link, in which the first gripper assembly is disposed ahead of the second outer link, the second gripper assembly is disposed ahead of the second inner ink, and a first shaft hole of the first gripper assembly and a second shaft hole of the second gripper assembly are coaxially arranged, such that the first and second gripper assemblies are coupled by a first shaft or a second shaft.

Further, the first and second gripper assemblies each include: a gripper block that has the first tooth at the center of a curved groove, the first and second shaft holes, which are symmetrical at the left and right sides, and the first and second mounting holes at both sides outside the first and second shaft holes; first gripper member that is rotatably mounted in the first mounting hole and has a first spring guide inside the lower portion and the second tooth inside the upper portion; the second gripper member that is mounted on the second mounting hole, opposite to the first gripper member, and has a second spring guide inside the lower portion and the third tooth inside the upper portion; a guide block that is mounted on the rear of the gripper block and has one side with a gap from the first gripper member and the other side being in contact with the second gripper member; and a compression spring that is mounted on the first spring guide and the second spring guide and applies restoring force in the expansion direction.

Further, the distance between the outermost sides of the first gripper member and the second gripper member may be smaller than the distance between the centers of the first mounting hole and the second mounting hole and larger than the distance between the outer sides of the lower ends of the first gripper member and the second gripper member.

Further, the angle made by a line connecting the centers of the first mounting hole and the second mounting hole and a line from the first mounting hole or the second mounting hole and tangential to the lower end of the first gripper member or the second gripper member may be acute, and the angle made by a line connecting the centers of the first mounting hole and the second mounting hole and a line from the first mounting hole or the second mounting hole and tangential to the lower end of the first gripper member or the second gripper member may be acute.

Further, the chain assembly includes: first and second outer links having the first and second fastening holes and the third and fourth fastening holes at both sides, respectively; and first and second inner links disposed offset with contact surfaces with respect to the first and second outer links inside the first outer link and the second inner link and having fifth and sixth fastening holes and seventh and eighth fastening holes at both sides, respectively, in which the first and second outer links and the first and second inner links may be formed in a shape having a convex lower portion and a space such that the first tooth protrudes, at the center, when seen from the front.

The details of other embodiments are included in the detailed specification and the drawings.

In a tool gripper chain according to a disclosed embodiment, which has the configuration described above, the chain can bend in two directions, such that the chain can be disposed offset with contact surfaces and a more number of tools can be mounted and held in a unit area.

DESCRIPTION OF THE DRAWINGS

FIGS. 3 and 4 are exemplary views showing gripper assemblies of the tool gripper chain bendable in two directions according to a disclosed embodiment, in which FIG. 3 is a front perspective view and FIG. 4 is a rear perspective view.

DETAILED DESCRIPTION

Figure 1:
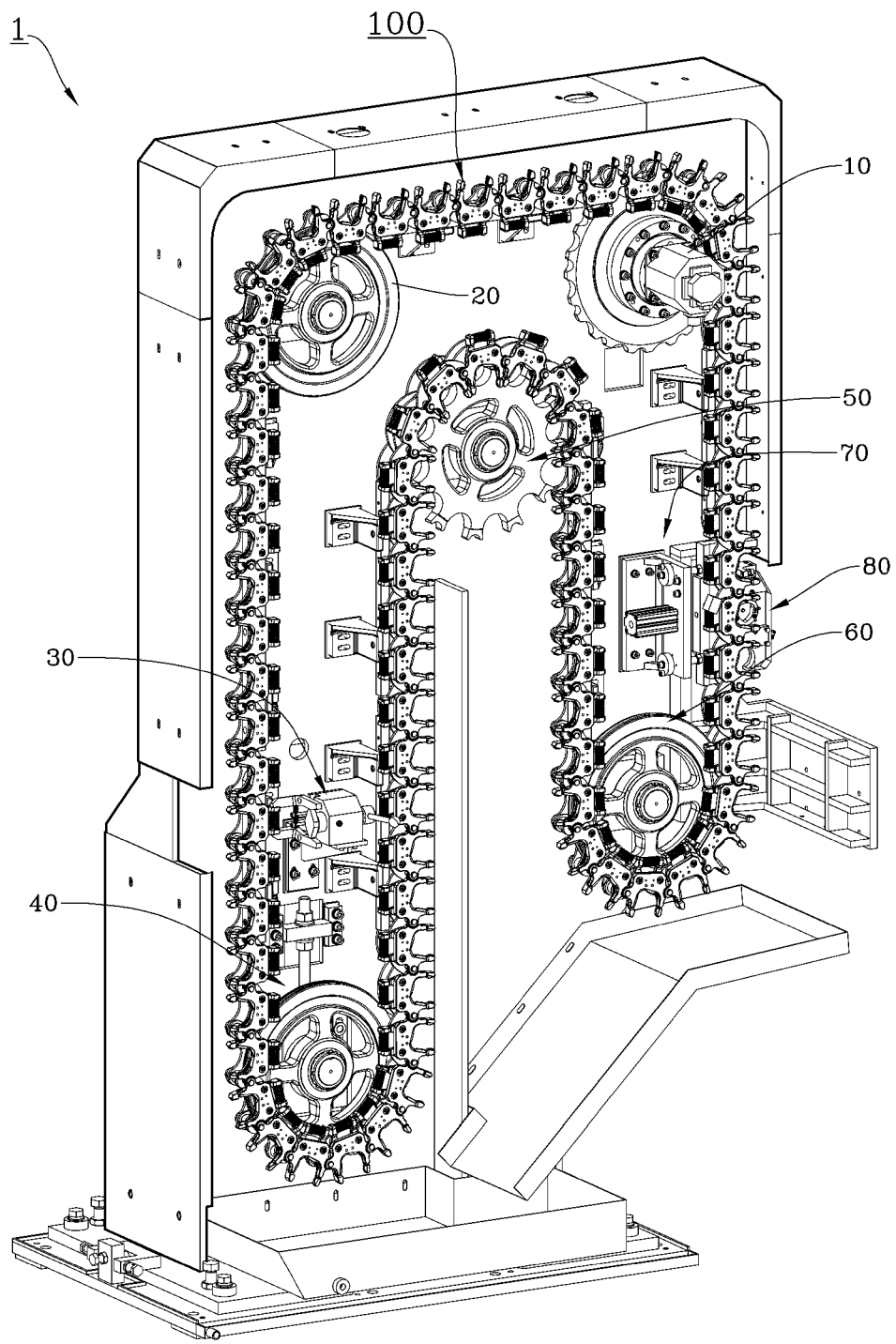
FIG. 1 is an exemplary view illustrating an example of a tool magazine equipped with a tool gripper chain bendable in two directions according to a disclosed embodiment.

Explanation of Main Reference Numerals and Symbols

| | |
|---|---|
| 1: Tool magazine | 10: Driving unit |
| 11: Driving motor | 12: Driving sprocket |
| 20, 60: First, third idle pulley | 30: Manual gripper expander |
| 40: Chain tension adjustor | 41: Second idle pulley |
| 50: Idle sprocket | 51: Groove |
| 70: Tool locator | 71: Pressing member |
| 72: Actuator | 90: Non-slip member |
| 100: Tool gripper chain | 110a, 110b: Gripper assembly |
| 120: Gripper block | 121a, 121b First, second shaft hole |
| 122a, 122b: First, second mounting hole | |
| 123: First tooth | 130: Guide block |
| 131: Inclined portion | 1401, 140b: First, second gripper |
| 141a, 141b: First, second gripper shaft hole | |
| 142a, 142b: First second spring guide | |
| 143a, 142b: Second, third tooth | 144a, 144b: First, second side |
| 200: Chain assembly | 210, 220: First, second outer link |
| 230: 240: First, second inner link | 250a 250b: First, second collar |
| 211, 212, 221, 222, 231, 232, 241, 242: First to eighth fastening hole | |
| 260a, 260b: First, second shaft | 261, 262, 263: First, second, third stage |

A tool gripper chain according to a disclosed embodiment has a chain assembly 200 that includes: gripper blocks 120 that each have a first tooth 123 at the center of a curved groove; first and second gripper assemblies 110a and 110b that have first and second gripper members 140a and 140b rotatably mounted on the rear of the gripper blocks 120 and grip a tool; first and second outer links 210 and 220 that are formed in an arc shape; first and second inner links 230 and 240 that are formed in an arc shape and disposed offset with contact surfaces with respect to the first and second outer links 210 and 220 between the first outer link 210 and the second outer link 220; and first and second collars 250a and 250b that are disposed between the first inner link 230 and the second inner link 240, in which the first gripper assembly 110a is disposed ahead of the second outer link 220, the second gripper assembly 110b is disposed ahead of the second inner ink 240, and a first shaft hole 122b of the first gripper assembly 110a and the second shaft hole 122a of the second gripper assembly 110b are coaxially arranged, such that the first and second gripper assemblies 110a and 110b are coupled by a first shaft 260a or a second shaft 260b.

Advantages and features of the disclosed embodiments and methods to achieve them will be elucidated from exemplary embodiments described below in detail with reference to the accompanying drawings.

Like reference numerals designate like components throughout the specification.

Figure 2:
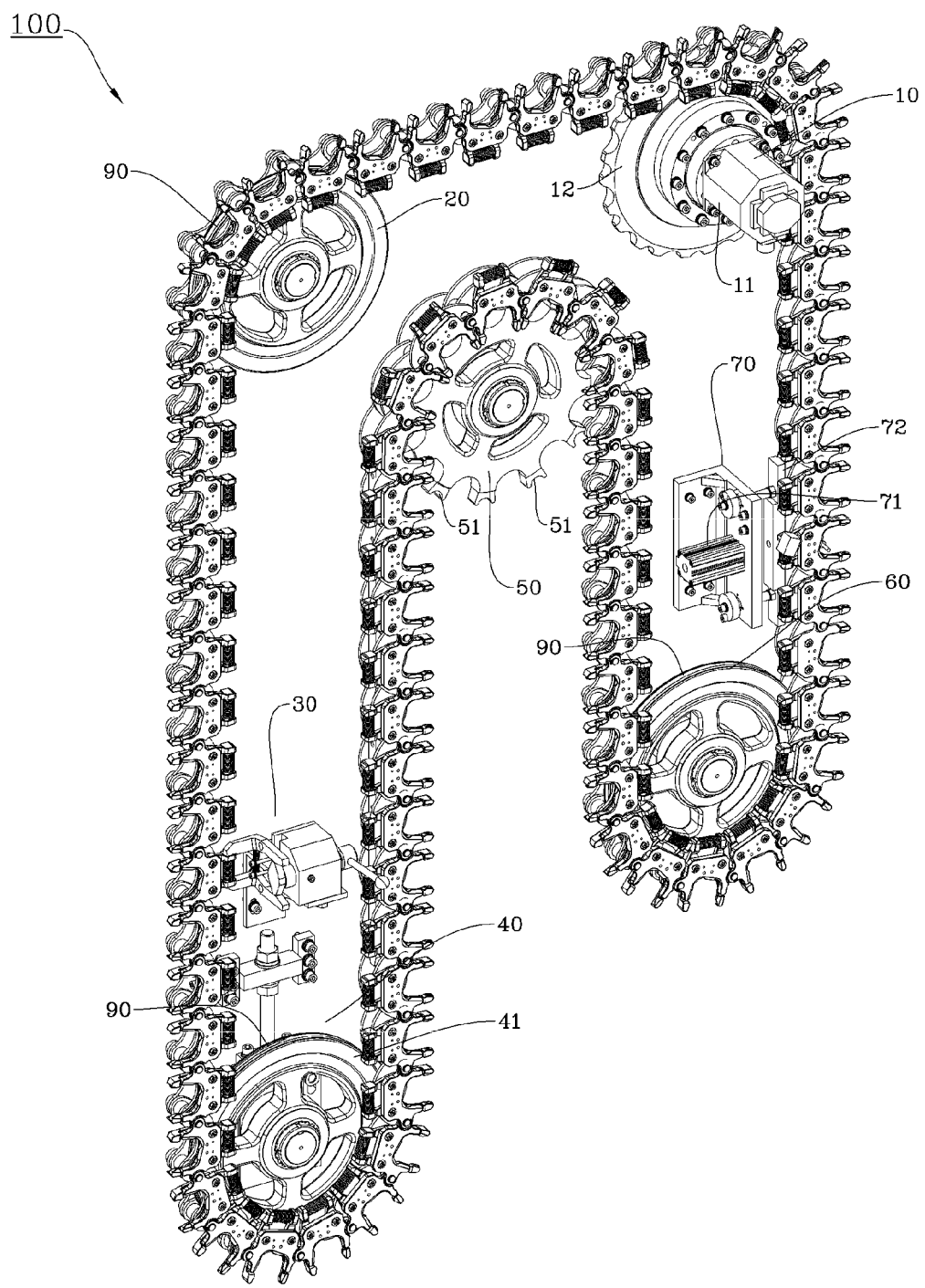
FIG. 2 is an exemplary view illustrating the tool gripper chain bendable in two directions according to a disclosed embodiment.

A tool gripper chain bendable in two directions according to a disclosed embodiment is described hereafter with reference to FIGS. 1 and 2.

FIG. 1 is an exemplary view illustrating an example of a tool magazine equipped with a tool gripper chain bendable in two directions according to a disclosed embodiment and FIG. 2 is an exemplary view illustrating the tool gripper chain bendable in two directions according to a disclosed embodiment.

As shown in FIG. 1, a tool gripper chain 100 bendable in two directions according to a disclosed embodiment is mounted on a side of a tool magazine 1 and a tool is mounted and held in the first and second gripper assemblies 110a and 110b described below.

Further, as shown in FIGS. 1 and 2, the tool gripper chain bendable in two directions according to a disclosed embodiment bends inward and outward, such that the chain assembly 200 can bend offset with contact surfaces, and first, second, and third idle pulley 20, 41, or 60, a driving sprocket 12, or the idle sprocket 50 is disposed at the bending portion and operates and guides the chain assembly 200.

A process when the tool gripper chain 100 bendable in two directions according to a disclosed embodiment passes is described in more detail hereafter.

As shown in FIGS. 1 and 2, the tool magazine 1 includes, at a side, a driving unit 10 that operates the chain assembly 200, the first idle pulley 20 that guides the chain assembly 200, a manual gripper expander 30 that manually opens a specific gripper, a chain tension adjustor 40 that adjusts tension of the chain assembly 200, the idle sprocket 50 that guides the chain assembly 200 that bends backward, and the third idle pulley 60 that guides movement of the chain assembly 200, and a tool locator 70 that locates and temporarily fixes the chain assembly 200 and the gripper assemblies 100a and 100b at the position where a tool is switched.

The driving unit 10 operates the chain assembly 200 by rotating the driving sprocket 12 with a driving motor 11, in which the driving motor rotates forward or backward in response to a command from a controller of a machine tool and the amount of rotation is controlled such that specific first and second gripper assemblies can reach the tool switch position.

The manual gripper expander 30 is closed when a lever is pulled, such that when the manual gripper expander 30 operates, with the first and second gripper assemblies 110a and 110b within an operation range of the manual gripper expander 30, a tool can be mounted or taken out by hands in or from the first and second gripper assemblies 110a and 110b.

The chain tension adjustor 40 implemented by rotatably mounting the second idle pulley 41 at the end portion of a guide bar that moves straight, such that when the second idle pulley 41 is moved outward, tension is applied and the chain assembly 200 is tightened, whereas when the second idle pulley 41 is moved inward, tension exerted in the chain assembly 200 decreases.

The idle sprocket 50 is installed without load and grooves 51 are formed on the outer circumferential surface to be engaged with the chain assembly 200.

The outer shape of the first, second, and third idle pulleys 20, 41, and 60 may be formed in a disc shape and a non-slip member 90 may be disposed on the outer circumferential surface, and particularly, the non-slip member 90 may be made of an elastic material, such that noise/vibration can be absorbed/attenuated.

The tool locator 70 includes a pressing member 71 having a shape corresponding to the chain assembly 200 and the pressing member 71 is moved forward/backward by the operation of an actuator 72, such that when the pressing member 71 moves forward, the chain assembly 200 is pushed and located, whereas when the pressing member 71 moves backward, the chain assembly 200 can freely move.

Hereafter, the configuration of the tool gripper chain 100 bendable in two directions according to a disclosed embodiment is described in more detail with reference to FIGS. 3 to 6.

Figure 3:
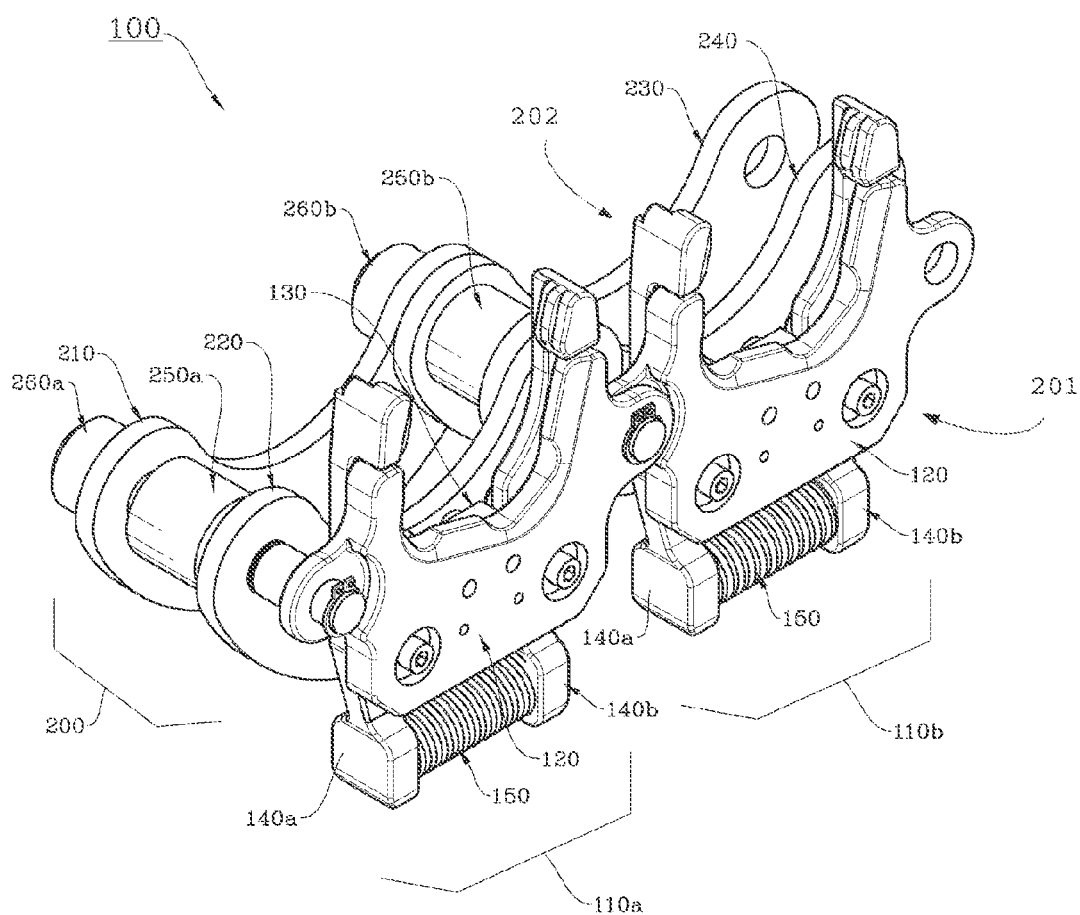
Figure 4:
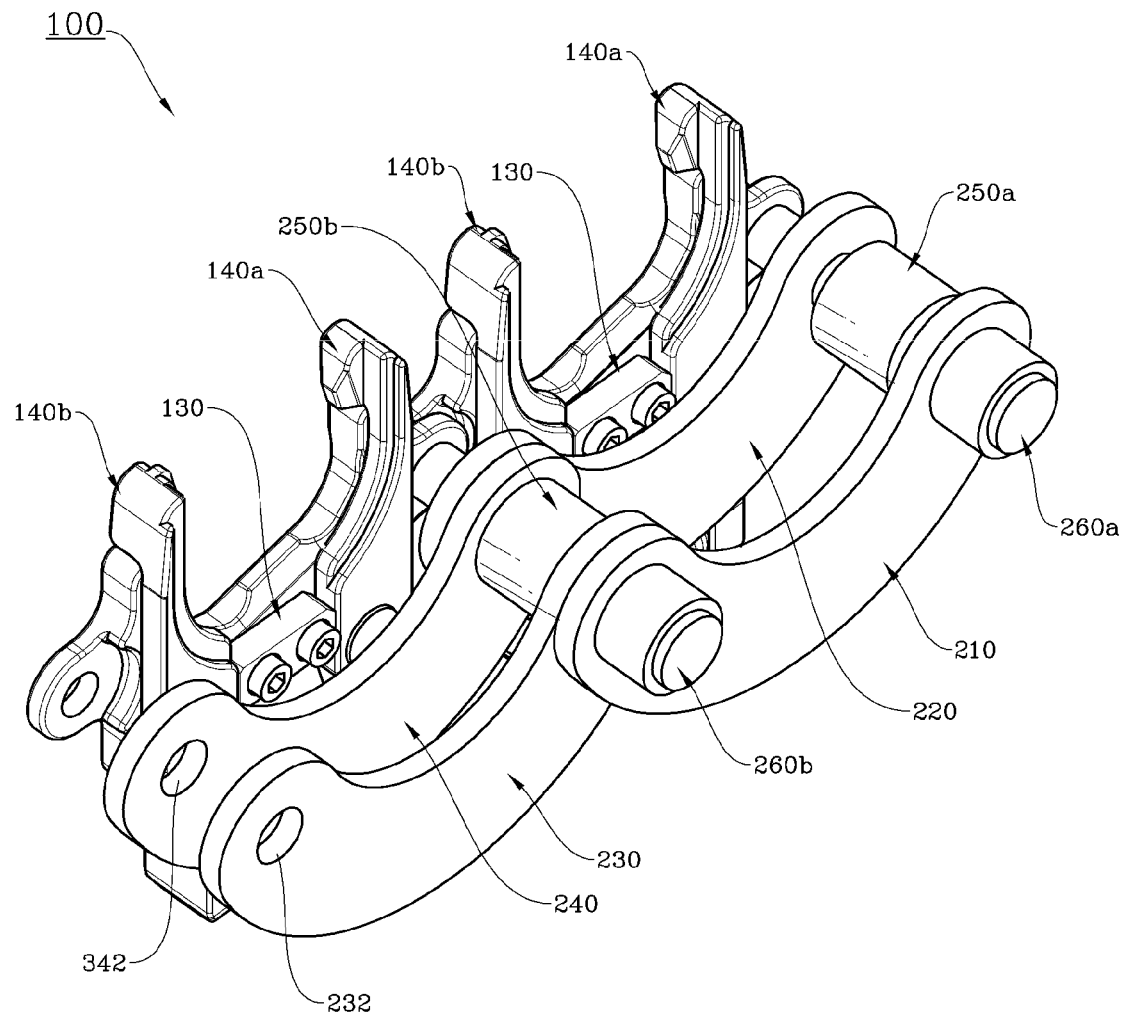

FIGS. 3 and 4 are exemplary views showing the gripper assemblies of the tool gripper chain bendable in two directions according to a disclosed embodiment. FIG. 3 is a front perspective view, FIG. 4 is a rear perspective view, FIG. 5 is an exemplary exploded view illustrating the configuration of the chain and the gripper assemblies of the tool gripper chain bendable in two directions according to a disclosed embodiment, and FIG. 6 is an exemplary front view illustrating the configuration of the chain and the gripper assemblies of the tool gripper chain bendable in two directions according to a disclosed embodiment.

Figure 5:
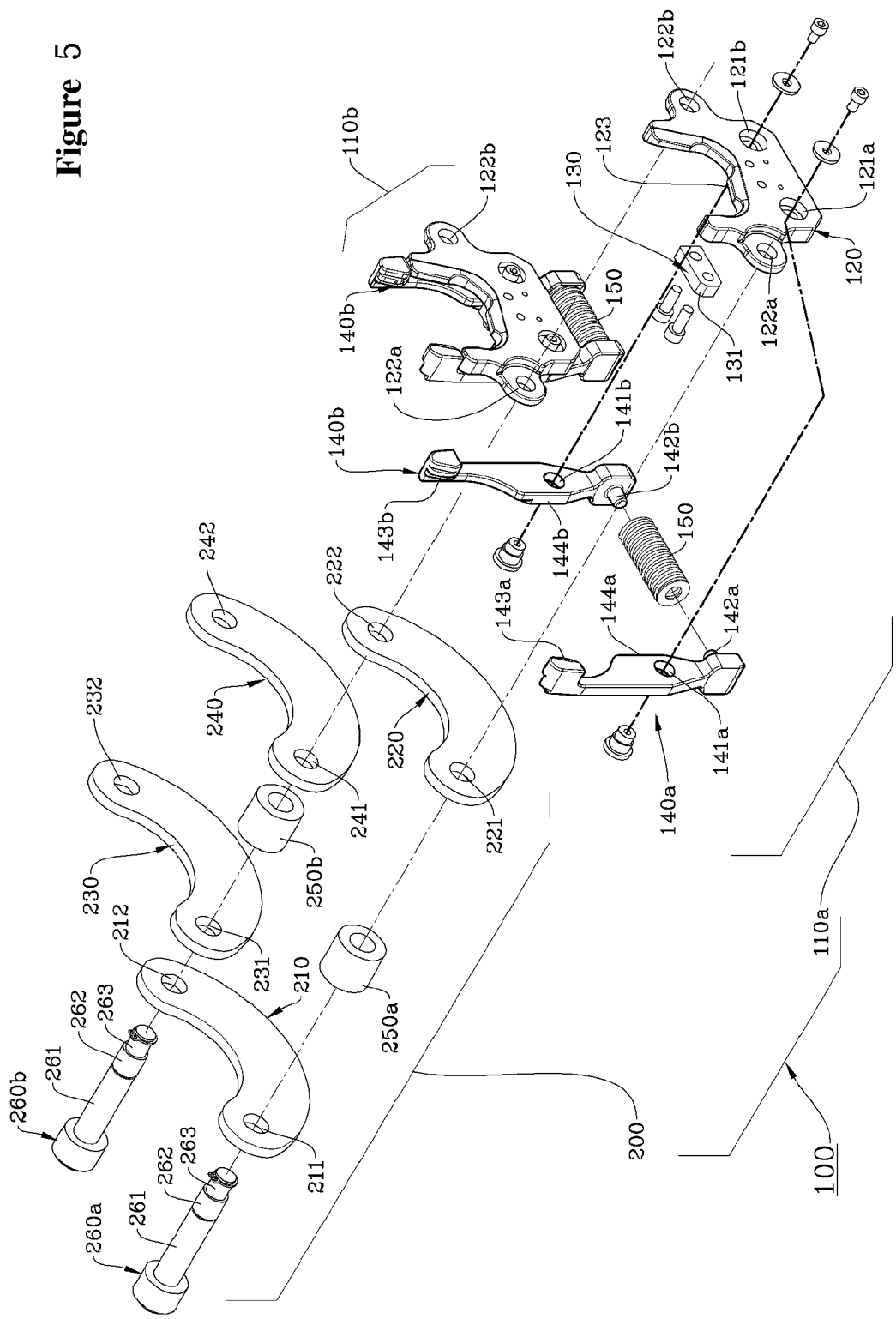
FIG. 5 is an exemplary exploded view illustrating the configuration of a chain and the gripper assemblies in the tool gripper chain bendable in two directions according to a disclosed embodiment.
Figure 6:
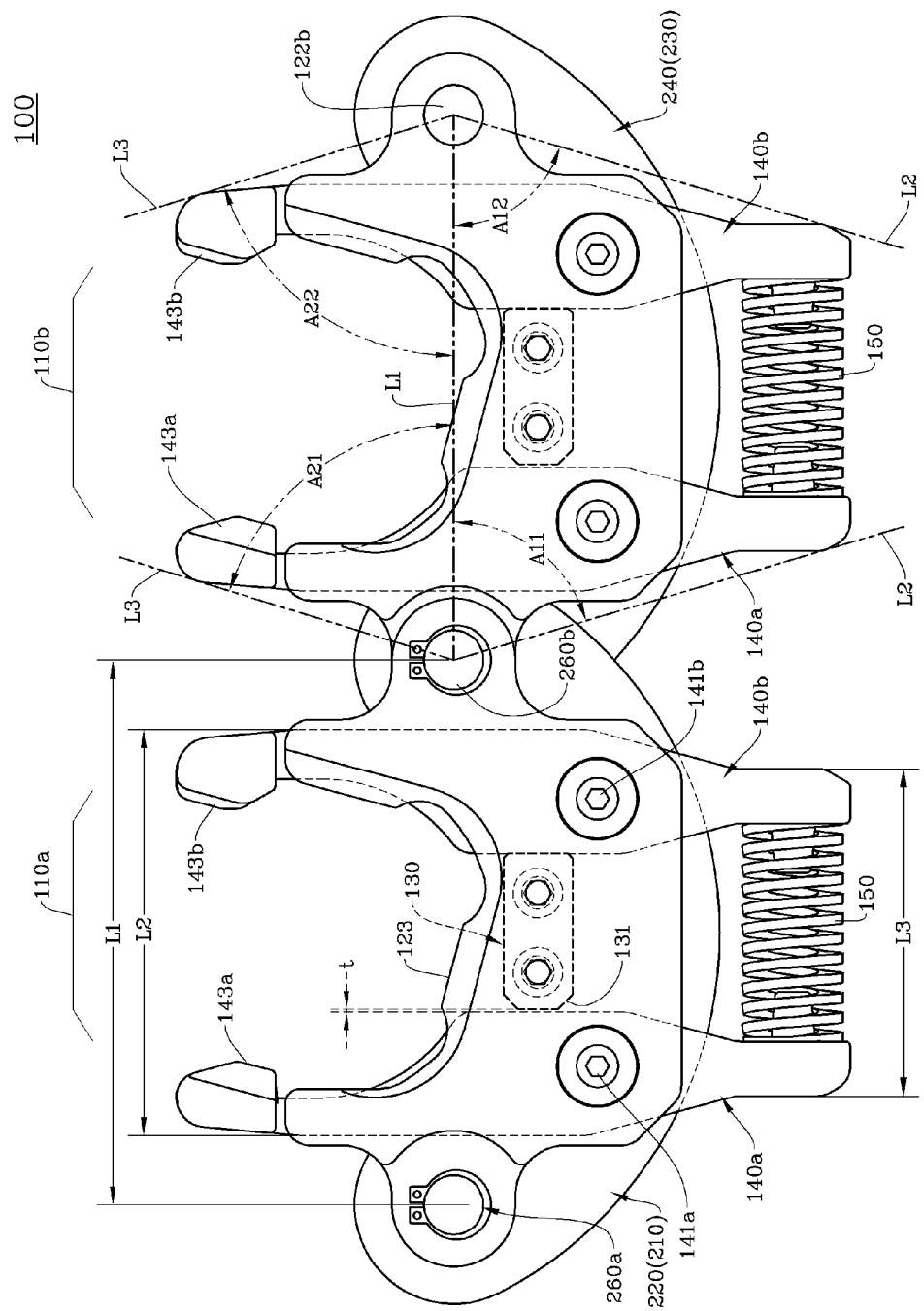
FIG. 6 is an exemplary front view illustrating the configuration of the chain and the gripper assemblies in the tool gripper chain bendable in two directions according to a disclosed embodiment.

As shown in FIGS. 3 to 5, the tool gripper chain 100 has a front side 201 and a rear side 202 and can be largely divided into the first and second gripper assemblies 110a and 110b and the chain assembly 200.

The first and second gripper assemblies 110a and 110b each include the gripper block 120 having the first tooth 123 at the upper center, the first and second gripper members 140a and 140b rotatably coupled to the rear of gripper block 120, and a compression spring 150 disposed under the first and second gripper assemblies 140a and 140b and applying force to close a second tooth 143a and a third tooth 143b that are formed at the ends of the first and second gripper assemblies 140a and 140b.

Further, the chain assembly 200 includes first and second outer links 210 and 220 formed in arc shapes, first and second inner links 230 and 240 formed in arc shapes and disposed offset with contact surfaces with respect to the first and second outer links 210 and 220 between the first outer link 210 and the second inner link 220, and first and second collars 250a and 250b disposed between the first inner link 230 and the second inner link 240.

Further, the first gripper assembly 110a is disposed ahead of the second outer link 220, the second gripper assembly 110b is disposed ahead of the second inner link 240, and a first shaft hole 121a of the first gripper assembly 110 and a second shaft hole 121b of the second gripper assembly 110b are coaxially arranged, such that the first gripper assembly 110a and the second gripper assembly 110b may be coupled by a first shaft 260a and a second shaft 260b.

The configuration of the first and second gripper assemblies 110a and 110b are described first in more detail.

The first and second gripper assemblies 110a and 110b may each include: the gripper block 120 that has the first tooth 123 at the upper center, the first and second shaft holes 121a and 121b, which are symmetrical at the left and right sides, and the first and second mounting holes 122a and 122b at both sides outside the first and second shaft holes 121a and 121b; the first gripper assembly 140a that is rotatably mounted in the first mounting hole 122a and has a first spring guide 142a inside the lower portion and a second tooth 143a inside the upper portion; the second gripper member 140b that is mounted on the second mounting hole 122b, opposite to the first gripper member 140a, and has a second spring guide 142b inside the lower portion and a third tooth 143b inside the upper portion; a guide block 130 that is mounted on the rear of the gripper block 120 and has one side with a gap (t) from the first gripper member 140a and the other side being in contact with the second gripper member 140b; and the compression spring 150 that is mounted on the first spring guide 142a and the second spring guide 142b and applies restoring force in the expansion direction.

Further, as shown in FIG. 6, the distance L2 between the outermost sides of the first gripper member 140a and the second gripper member 140b may be smaller than the distance L1 between the centers of the first mounting hole 122a and the second mounting hole 122b and larger than the distance L3 between the outer sides of the lower ends of the first gripper member 140a and the second gripper member 140b.

On the other hand, as shown in FIG. 6, the angle A11 or A12 made by the line L1 connecting the centers of first mounting hole 122a and second mounting hole 122b and the line L2 from the first mounting hole 122a or the second mounting hole 122b and tangential to the lower end of the first gripper member 140a or the second gripper member 140b may be acute while the angle A21 and A22 made by the line L1 connecting the centers of the first mounting hole 122a and the second mounting hole 122b and the line L3 from the first mounting hole 122a or the second mounting hole 122b and tangential to the upper end of the first gripper member 143a or the second gripper member 143b may be acute.

The configuration of the chain assembly 200 is described in more detail hereafter.

The chain assembly includes first and second outer links 210 and 220 having first and second fastening holes 211 and 212 and third and fourth fastening holes 221 and 222 at both sides, respectively, and first and second inner links 230 and 240 disposed offset with contact surfaces with respect to the first and second outer links 210 and 220 inside the first outer link 210 and second outer link 220 and having fifth and sixth fastening holes 231 and 232 and seventh and eighth fastening holes 241 and 242 at both sides, respectively, as shown in FIGS. 3 to 5.

In particular, the first and second outer links 210 and 220 and the first and second inner links 230 and 240 may be formed in a shape having a convex lower portion and a space such that the first tooth 123 protrudes, at the center, when seen from the front, as shown in FIG. 6.

Although portions of the first and second gripper assemblies 110a and 110b and the chain assembly 200 were described above, the entire may be combined, as shown in FIGS. 1 and 2, and portions of the first and second gripper assemblies 110a and 110b and the chain assembly 200 may be repetitively connected.

Hereafter, the operation of the tool gripper chain 100 bendable in two directions 100 according to a disclosed embodiment is described.

First, the operation of the first and second gripper assemblies 110a and 110b is described with reference to FIGS. 3, 4, and 6.

The first and second gripper assemblies 110a and 110b grip a tool and are engaged at three points by first, second, and third teeth 123, 143a, and 143b.

The tool is removed, when the second tooth 143a and the third tooth 143b of the first gripper member 140a and the second gripper member 140b are opened, and when the tool is mounted, the closer the center of weight of the tool to the center of the chain assembly 200, the more the tool becomes stable.

That is, since the upper portions of the first and second outer links 210 and 220 and the first and second inner links 230 and 240 are depressed, they can avoid interference with the sink of the tool.

Further, since a first side 144a inside the first gripper member 140a has a guide block 130 and gap (t), the first gripper member 140a can rotate within a predetermined range of angle, and since a second side 114, which is one side of the second gripper member 140b, is in contact with the guide block 130, the second gripper member 140b can be prevented from rotating.

That is, the first gripper member 140a can freely rotate within the contact range with the guide block 130, while the second gripper member 140b can be fixed.

Further, the compressing spring 150 applies force such that the second tooth 143a of the first gripper member 140a is kept toward the third tooth 143b, such that the tool mounted on f the first and second gripper assemblies 110a and 110b can be stably held, without unexpectedly separating or falling.

Bending of the tool gripper chain 100 is described hereafter.

Figure 7:
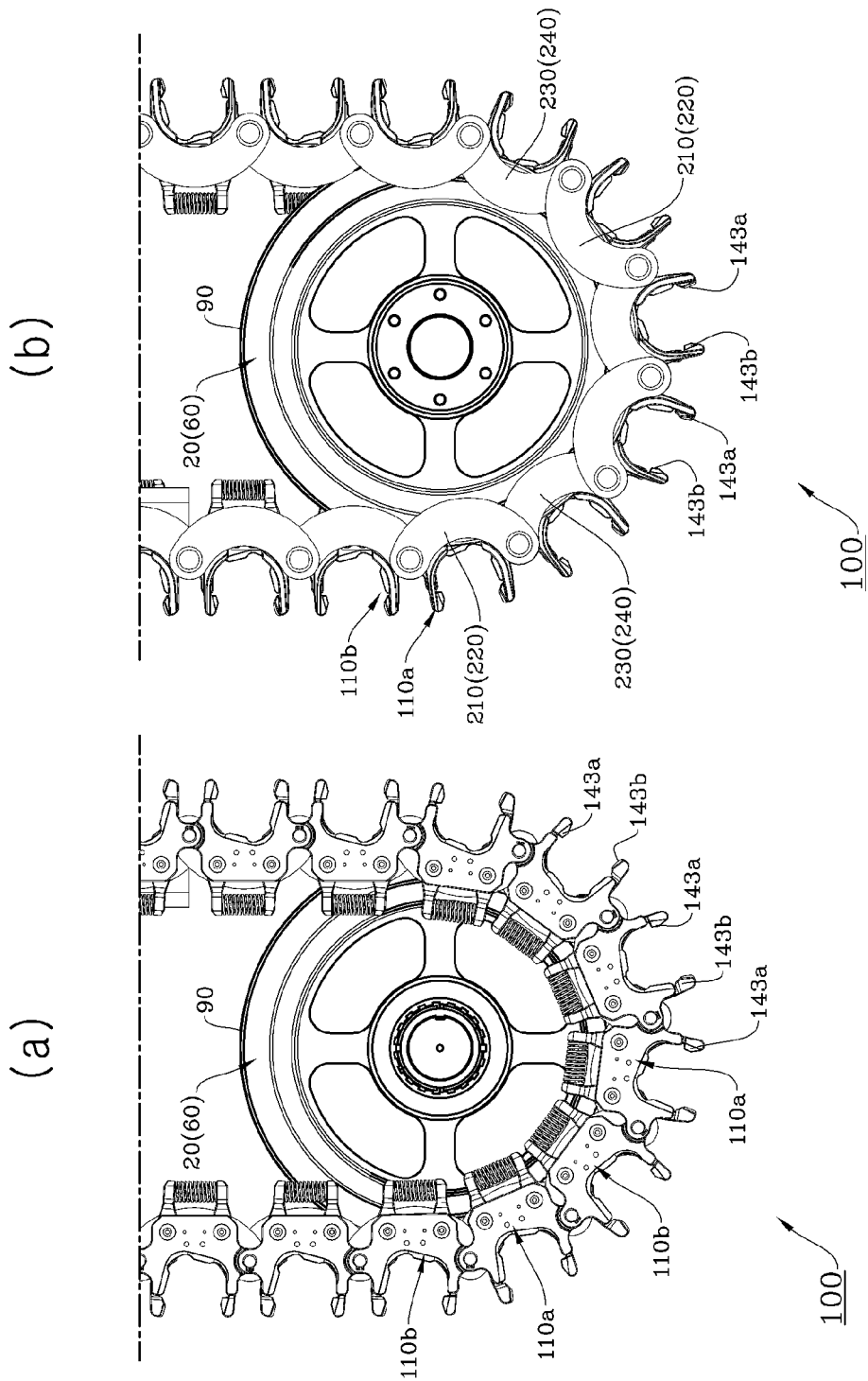
FIG. 7 is an exemplary view illustrating the operation of the tool gripper chain bendable in two directions according to a disclosed embodiment, that is, showing the front and the rear of an example when the chain bends outward.
Figure 8:
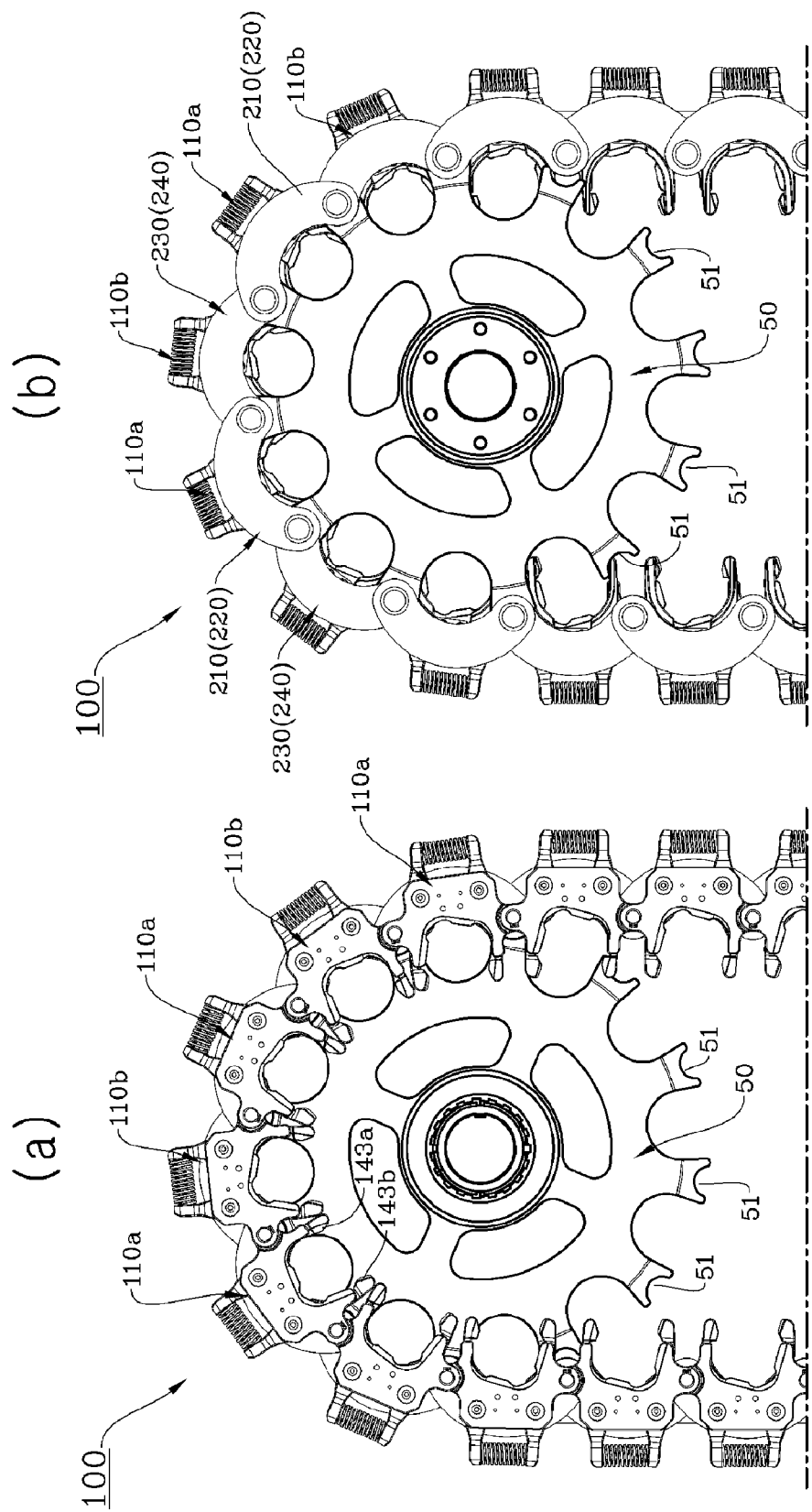
FIG. 8 is an exemplary view illustrating the operation of the tool gripper chain bendable in two directions according to a disclosed embodiment, that is, showing the front and the rear of an example when the chain bends inward.

FIG. 7 is an exemplary view illustrating the operation of tool gripper chain 100 bendable in two directions according to a disclosed embodiment, in which the front and the rear are shown when the chain bends outward, and FIG. 8 is an exemplary view illustrating the operation of the tool gripper chain 100 bendable in two directions according to a disclosed embodiment, in which the front and the rear are shown when the chain bends inward.

The example when the chain bends outward is described first with reference to FIG. 7.

When the chain assembly 200 bends, there is no interference between the first gripper assembly 110 and adjacent the second gripper assembly 110b and the operation is described with reference to FIG. 6.

The first gripper assembly 110a and the second gripper assembly 110b always bends about the first shaft 260a or the second shaft 260b, regardless of bending in any direction, that is, inward or outward.

As shown in detail in FIGS. 5 and 6, the first and second shafts 260a and 260b are inserted in the first and second mounting holes 122a and 122b of the gripper block 130 and the distance L1 between the centers of the first mounting hole 122a and the second mounting hole 122b is larger than the distance L2 between the outermost sides of the first and second gripper members 140a and 140b and also larger than the distance L3 between the outer sides of the lower ends of the first and second gripper members 140a and 140b, such that the first gripper assembly 110a does not interfere with the second gripper assembly 110b, when bending about the first shaft 260a or the second shaft 260b.

Further, since the angle A11 or A12 made by the line L1 connecting the centers of first mounting hole 122a and second mounting hole 122b and the line L2 from the center of the first mounting hole 122a or the second mounting hole 122b and tangential to the lower end of the first gripper member 140a or the second gripper member 140b is acute while the angle A21 or A22 made by the line L1 connecting the centers of the first mounting hole 122a and the second mounting hole 122b and the line L3 from the center of the first mounting hole 122a or the second mounting hole 122b and tangential to the upper end of the first gripper member 140a or the second gripper member 140b is acute, a sufficient space where the first gripper assembly 110a and the second gripper assembly 110 can bend is ensured, such that they can bend about the first shaft 260a or the second shaft 260b, without interference.

FIG. 7 shows an example of bending with the inside narrow and the outside wide, in which (a) of FIG. 7 is a front view and (b) of FIG. 7 is a rear view.

In particular, as shown in (b) of FIG. 7, the first and third idle pulleys 20 and 60 or the second idle pulley 41 is inserted between the first and second inner links 230 and 240, in which the convex portions of the first and second inner links 230 and 240 are guided on the first and second pulleys 20 and 60, such that the chain assembly 200 can be prevented from separating.

Further, the first and second columns 250a and 250b are in contact with the outer circumferential surfaces of the first, second, and third pulley 20, 41, and 60 and a non-slip member 90 is disposed on the outer circumferential surfaces, such that non-slip member 90 absorbs shock and noise.

On the other hand, as shown in FIG. 8, bending may be achieved, with the second and third teeth 143a and 143b inside and the compressing spring 150 outside.

The guide may be achieved by the first, second, and third idle pulleys 20, 41, and 60, or the idle sprocket 50, as shown in FIG. 8.

Further, as shown in FIGS. 1 and 2, it may be pulled by the driving sprocket 12.

The driving sprocket 12 or the idle sprocket 50 has a groove 51 on the outer circumferential surface and the first and second collars 250a and 250b are inserted in the grooves 51.

As described above, since the tool gripper chain 100 according to a disclosed embodiment can bend inward or outward, the chain assembly can smoothly move, even if the chain assembly is disposed offset with contact surfaces.

Therefore, the length of the chain may be further increased and a more number of gripper assemblies may be mounted on the chain, such that a more number of tools can be mounted and held.

Although exemplary embodiments have been described above with reference to the drawings, it will be understood to those skilled in the art that the present invention may be implemented in various ways without changing the spirit of necessary features of the present invention.

Therefore, the embodiments described above should be construed as being exemplified and not limiting the present invention, the scope of the present invention is characterized by the detailed description of the following claims, and all changes and modifications from the meaning, range, and equivalent concept of claims should be construed as being included in the present invention.

A tool gripper chain according to a disclosed embodiment can be used for machine tools that are required to mount and hold various types of tools.

The invention claimed is:

1. A tool gripper chain bendable in two directions, the tool gripper chain having a front side and a rear side, the tool gripper chain comprising:
   first and second gripper assemblies for gripping a tool, each having a gripper block having a front side and a rear side oriented respectively toward the front and rear sides of the tool gripper chain and a first tooth at the center of a curved groove, and the first and second gripper assemblies further having first and second gripper members rotatably mounted on the rear side of the gripper block; and
   a chain assembly having first and second outer links, first and second inner links disposed between the first outer link and the second outer link, and first and second collars disposed between the first inner link and the second inner link,
   wherein each of the first and second outer links and the first and second inner links have a front side and a rear side oriented respectively toward the front and rear sides of the tool gripper chain, and wherein the first gripper assembly is disposed in front of the second outer link, the second gripper assembly is disposed in front of the second inner link, and a first mounting hole of the first gripper assembly and a second mounting hole of the second gripper assembly are coaxially arranged so as to be coupled by a first shaft or a second shaft;
   wherein each gripper block has first and second shaft holes;
   the first gripper member is rotatably mounted about the first mounting hole and has a first spring guide in a first portion of the first gripper member and a second tooth in a second portion of the first gripper member;
   the second gripper member is rotatably mounted about the second mounting hole, and has a second spring guide in a first portion of the second gripper member and a third tooth in a second portion of the second gripper member;
   the first and second gripper assemblies each have a guide block mounted on the rear side of the gripper block, distanced with a gap from the first gripper member at one side of the guide block and in contact with the second gripper member at another side of the guide block; and
   the first and second gripper assemblies each have a compression spring mounted on the first spring guide and the second spring guide.

2. The tool gripper chain bendable in two directions according to claim 1, wherein a distance between outermost surfaces of the first gripper member and the second gripper member is smaller than a distance between centers of the first mounting hole and the second mounting hole and larger than a distance between outer surfaces of end portions of the first gripper member and the second gripper member.

3. The tool gripper chain bendable in two directions according to claim 1, wherein an angle made by a line connecting centers of the first mounting hole and the second mounting hole and a line from the first mounting hole or the second mounting hole tangential to a first end portion of the first gripper member or the second gripper member is acute, and
   wherein an angle made by a line connecting the centers of the first mounting hole and the second mounting hole and a line from the first mounting hole or the second mounting hole and tangential to a second end portion of the first gripper member or the second gripper member is acute.

4. The tool gripper chain bendable in two directions according to claim 1, wherein:
   the first outer link has first and second fastening holes each respectively positioned at different ends of the first outer link, and the second outer link has third and fourth fastening holes each respectively positioned at different ends of the second outer link; and
   the first inner link has fifth and sixth fastening holes each respectively positioned at different ends of the first inner link, and the second inner link has seventh and eighth fastening holes each respectively positioned at different ends of the second inner link,
   wherein the first and second outer links and the first and second inner links each are formed with a convex portion.

* * * * *